April 25, 1967  A. FORTIN ET AL  3,315,542
DEVICE FOR THE TRANSMISSION OF MOVEMENTS AND APPLICATION
OF SAID DEVICE TO REMOTE HANDLING APPLIANCES
Filed April 8, 1963  4 Sheets-Sheet 1

INVENTORS
ANTOINE FORTIN
MARCEL FORTIN
JEAN VERTUT
BY Bacon & Thomas
ATTORNEYS

INVENTORS
ANTOINE FORTIN
MARCEL FORTIN
JEAN VERTUT

United States Patent Office 3,315,542
Patented Apr. 25, 1967

3,315,542
DEVICE FOR THE TRANSMISSION OF MOVE-
MENTS AND APPLICATION OF SAID DE-
VICE TO REMOTE HANDLING APPLIANCES
Antoine Fortin, Courbevoie, Marcel Fortin, Le Chesnay, and Jean Vertut, Paris, France, assignors to Commissariat à l'Energie Atomique, Paris, France
Filed Apr. 8, 1963, Ser. No. 271,337
Claims priority, application France, Apr. 25, 1962, 895,538, Patent 1,350,624
6 Claims. (Cl. 74—665)

The present invention relates to devices for the transmission of movements, especially of the type employed in remote-handling appliances.

The invention is more especially concerned with those devices in which movements are transmitted solely by means of rotary shafts which are subjected to a torsional moment, while said movements can be angular displacements between two rigid elements and/or rotational movements of one part of a rigid element relatively to another along a common axis thereof.

The present invention is even more especially concerned with those devices for the transmission of movement, particularly of the differential-drive type and consisting solely of shafts, pinions and ring gears.

The primary object of the present invention is to design the above-mentioned devices in such manner as to meet with the various practical requirements more effectively than has hitherto been achieved, especially in order that said devices may transmit a movement of rotation from one shaft to another while nevertheless retaining the possibility of performing a movement of rotation or of angular displacement relatively to each other.

The invention mainly consists, while making provision for a pinion at the extremity of each of said two shafts, in coupling said pinions to each other in such manner that both pinions mesh with a toothed system of revolution about an axis with respect to which the rotary movement of the said two shafts is effected.

The invention also consists in certain characteristic arrangements which are employed more especially in conjunction with the relative movements of said shafts which it is desired to produce, viz:

If it is desired to produce an angular displacement which allows the two shafts to remain in concurrent relation, the toothed system which will be referred to as the system "of the first kind" is a pinion, the axis of said pinion being the fictitious axis which is common to the two cones of angular displacement of the two shafts;

If it is desired to produce a movement of rotation of the two shafts about a fictitious axis parallel to each other, the toothed system which will be referred to as the system "of the second kind" is a ring gear having the same axis, said ring gear being toothed internally and/or externally;

If it is desired to produce an angular displacement of two non-concurrent shafts, the toothed system which will be referred to as the system "of the third kind" is a double pinion which returns said shafts to the condition of two concurrent shafts.

The present invention further consists of a device for the transmission of movements from a set of driving shafts to a set of driven shafts, said device comprising at least two toothed systems having the same axis of one of the above-mentioned kinds, in which an angular displacement or rotational movement of the set of driving shafts about the axis of the toothed systems is transmitted in the form of individual rotational movements of the driven shafts and can be reproduced by a similar device placed at the output end, while the individual movements of rotation of the driving shafts do not consequently cease to be transmitted to the driven shafts.

The invention finally consists of a remote-handling device which will be described below and which entails the application of at least one of the arrangements noted above.

It will in any case be possible to obtain a better understanding of the present invention by means of the complementary description which is given below with reference to the accompanying drawings, it being understood that said complementary description and drawings are given primarily by way of indication and not in any sense by way of limitation.

There have been shown in these drawings only those elements which are necessary for a proper understanding of the invention while the corresponding elements of these different figures are designated by identical reference numerals.

Figure 1:
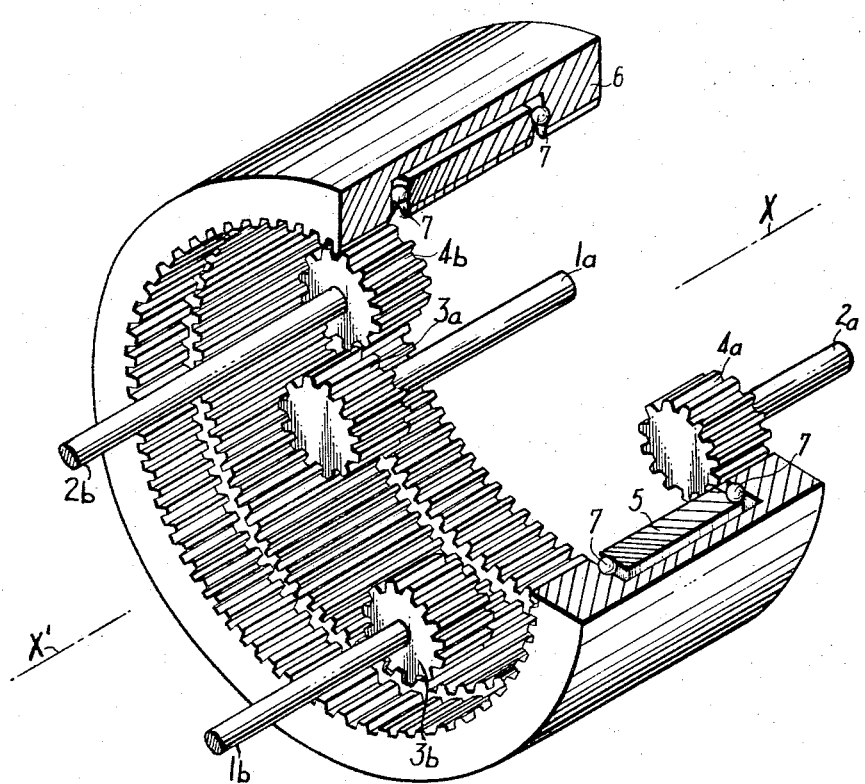
FIG. 1 is an isometric view of a double toothed system "of the second kind" in accordance with the invention.

In accordance with FIG. 1, when it is desired to transmit individual rotational movements of two parallel driving shafts $1a$ and $2a$ respectively to the two parallel driven shafts $1b$ and $2b$ while nevertheless permitting an infinite rotation of the plane of the driving shafts $1a$ and $2a$ about the axis X'–X relatively to the plane of the driven shafts $1b$ and $2b$, provision is made for toothed pinions $3a$, $4a$, $3b$, $4b$, respectively at the ends of the shafts $1a$, $2a$, $1b$, $2b$, the pinions $3a$ and $3b$ are caused to mesh with a ring gear 5 and the pinions $4a$ and $4b$ are caused to mesh with a ring gear 6, the two ring gears 5 and 6 having a common axis X'–X and are internally toothed, while the ring 5 is capable of rotating inside the ring gear 6 by virtue of a set of balls such as the ball 7.

A device of this kind which serves to transmit motion from the shaft $1a$ to the shaft $1b$ and also from the shaft $2a$ to the shaft $2b$ without preventing the movements of rotation about the axis X'–X of the plane of the shafts $1a$, $2a$, of the plane of the shafts $1b$, $2b$ or of a unit which is integral with the ring gear 6 will meet with a particularly valuable application in a remote-handling appliance which is associated with other coupling devices of the various types heretofore defined.

Figure 2:
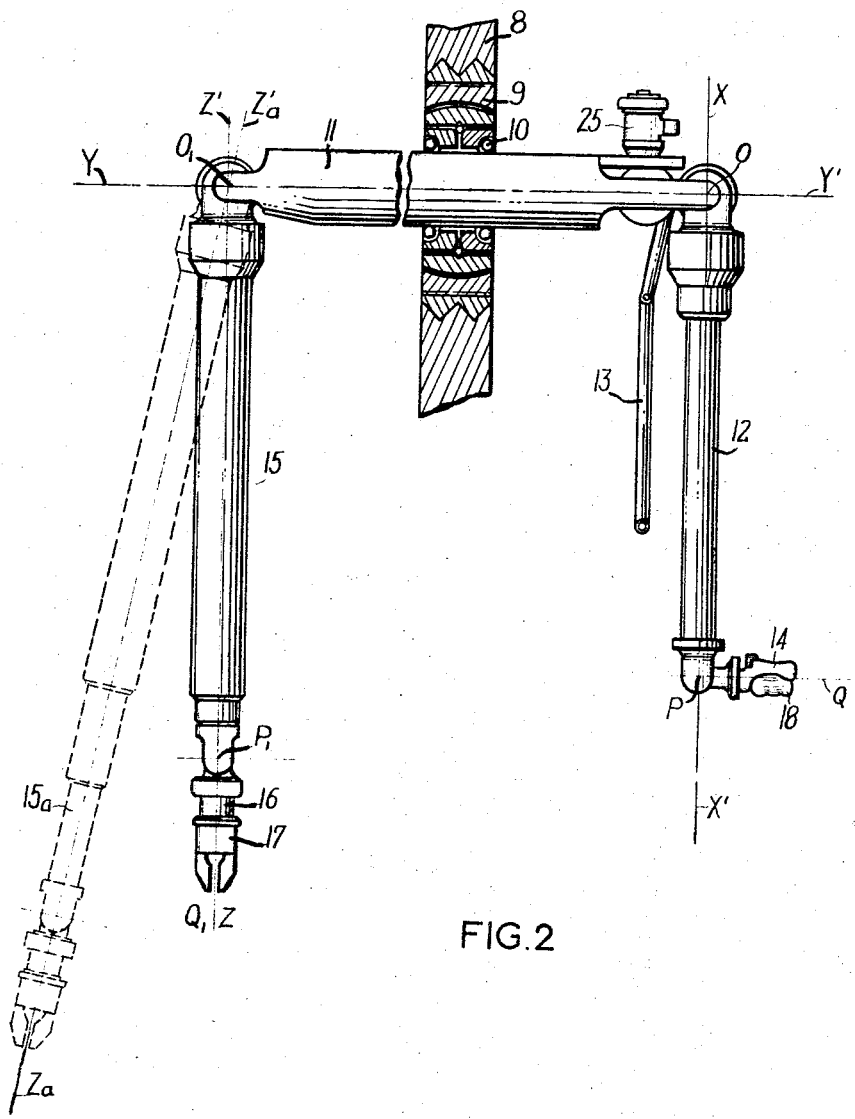
FIG. 2 is a simplified general view of a remote-handling device in accordance with the invention.

As can be seen in FIG. 2, a remote-handling appliance in accordance with the invention can be adapted to comprise on each side of a shielding wall 8 fitted with a swivel joint assembly 9 and a ball-bearing assembly 10 permitting of axial displacement, two substantially symmetrical components: the driving component on the right-hand side, the driven component on the left-hand side, said two components being coupled together by means of a bearing tube 11. The driving component or control arm 12 is pivotally coupled at 0 to the bearing tube 11 and is fitted with a handle 14 which is subjected to all the movements carried out by the operator. The driven component or receiving arm 15 is pivotally coupled at $0_1$ to the bearing tube 11 and terminates in a gripper-holder 16 and gripper 17 and is capable of carrying out all the movements imparted by the operator to the control arm 12 and handle 14. The handling appliance as thus designed is positioned in the shielding wall 8 which serves as a support for this latter by being fitted in a straight line inside the passageway which is provided, the axes Y'–Y, Z'–Z and $P_1$–$Q_1$ being thus in alignment.

A handling appliance of this kind is capable of performing nine movements:

*Three movements in the case of the gripper 17:*

(1) Clamping and releasing of the gripper 17, as controlled by means of the trigger 18 of the handle 14.

(2) Unlimited rotary movement in both directions of the gripper 17 about its axis $P_1-Q_1$, effected as a result of an equivalent rotation of the handle 14 about the axis P–Q of this latter.

(3) Two-way angular displacement of the gripper 17 about the axis $P_1$ at right angles to the axis Z–Z' of the receiving arm 15, effected as a result of an equivalent angular displacement of the handle 14 about the axis P which is at right angles to the axis X'–X of the control arm 12.

*Three movements in the case of the receiving arm 15:*

(4) Unlimited rotary movement of the receiving arm 15 about its axis Z'–Z produced by an equivalent rotary movement of the control arm 12 about the axis X'–X of this latter.

(5) Angular displacement of the receiving arm 15 relatively to the axis $0_1$ which is at right angles to the axis Y'–Y of the bearing tube, as shown at Z'a–Za, as initiated by an equivalent displacement of the control arm 12, with the possibility of displacing one arm relatively to the other by virtue of a special system of mechanical connection or so-called "dog clutch disengagement system" to which further reference will be made below.

(6) Telescopic movement by means of which the length of the receiving arm 15 can be varied (as shown at 15a) and which makes it possible in particular to raise or lower a load in a vertical plane.

*Three movements in the case of the bearing tube 11:*

(7) Rotary movement of the complete assembly about the axis Y'–Y of the bearing tube 11.

(8) Translational movement of the combined assembly along the axis Y'–Y of the bearing tube 11.

(9) Circular motion of the bearing tube 11 about the center of the knuckle-joint 9.

All the movements noted above can be combined without substituting one for another, this being achieved by virtue of the arrangements which are employed in accordance with the present invention.

Figure 3:
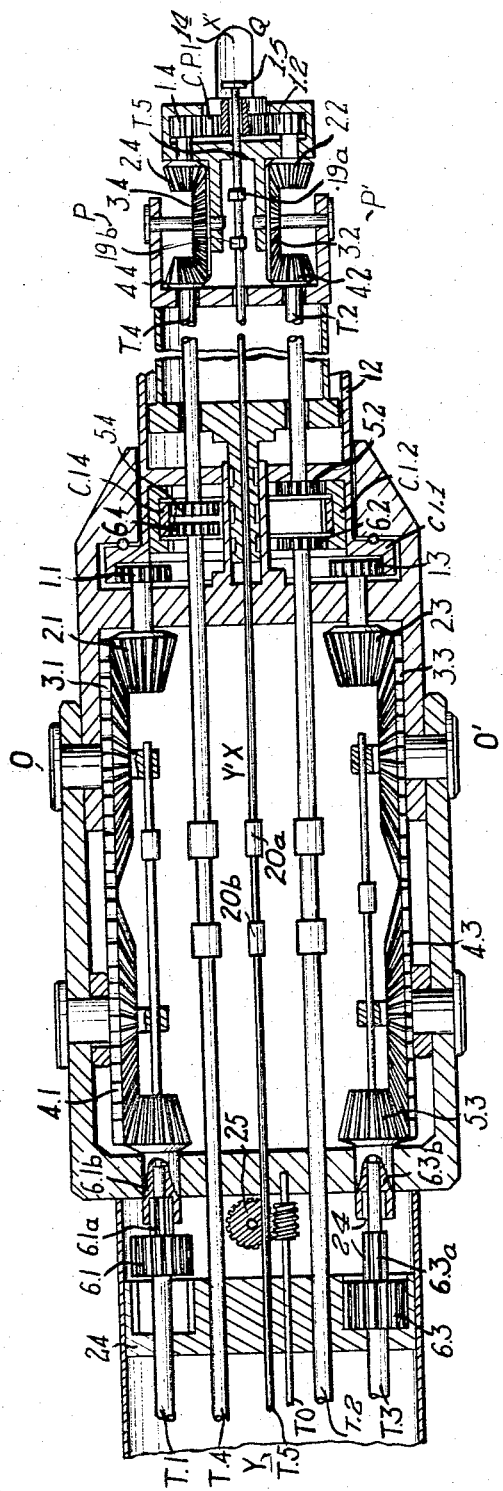
FIG. 3 is a view in axial cross-section of the driving portion of the device which is illustrated in FIG. 2.
Figure 4:
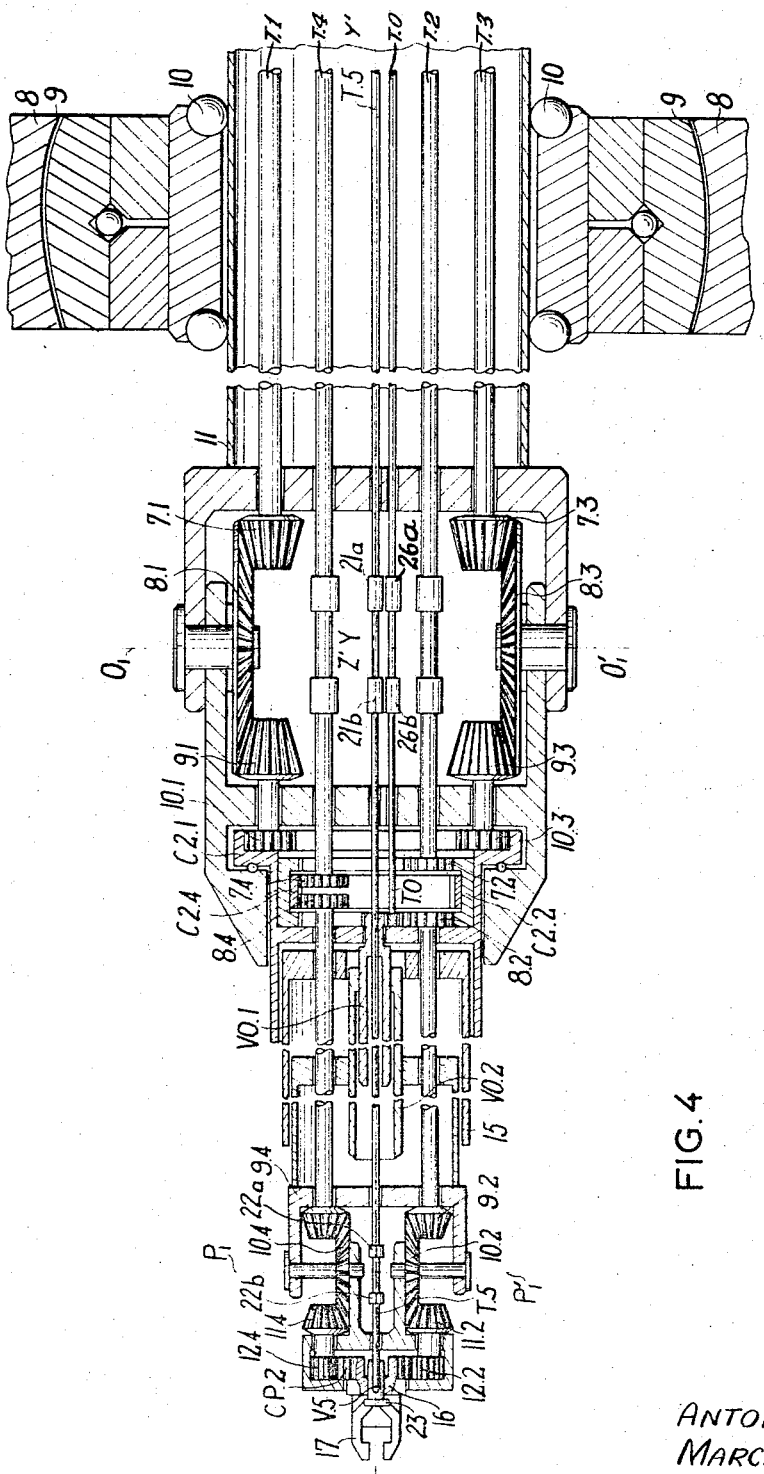
FIG. 4 is a view in axial cross-section of the driven portion of the device which is illustrated in FIG. 2.

Reference being made to FIGS. 3 and 4, the description which now follows will successively explain how the arrangements referred-to above are employed in relation to the various respective movements.

1.—*Movement of clamping and releasing of the gripper*

This movement is effected through a set of pinions (1, 5) so as to impart a rotational movement to the link-rod (T–5).

The link-rod (T–5) comprises a flexible-shaft system or a system of double universal joints (19a–19b, 20a–20b, 21a–21b, 22a–22b) which permit said link-rod to follow the orientations of the different parts of the apparatus about the axes P–P', 0–0', $0_1-0_1'$ and $P_1-P_1'$.

The extremity of the link-rod (T–5) is provided with a threaded portion (V–5) which is screwed into a nut 23, the movements of which effect the opening and closing of the gripper.

This movement can also be effected by means of any other tractive mechanism (pneumatic, hydraulic, etc.).

2.—*Movement of rotation of the gripper*

The rotation of the handle 14 about the axis P–Q produces through the intermediary of the ring gear (CP.1) the rotation of the spur pinions (1–2) and (1–4) and consequently the rotation of the bevel pinions (2–2) and (2–4), these latter driving the bevel pinions (4–2) and (4–4) through the intermediary of two pinions (3–2) and (3–4) which are mounted to rotate freely on their spindles, the combined assembly thus constituting a double transmission of the "first kind" in accordance with the invention.

The pinions (4–2) and (4–4) are integral with the two link-rods (T–2) and (T–4) which rotate in the same direction and accordingly transmit this movement to the gripper 17 by means of a similar system which is located at the same end as the gripper-holder 16, and which consists of pinions (9–2) and (9–4), idler pinions (10–2) and (10–4), pinions (11–2) and (11–4), (12–2) and (12–4) and finally the ring gear (CP.2) which is integral with the gripper-holder 16.

It will be understood that the rotary motion of the gripper 17 does not produce any reaction on the opening or closure of this latter.

The link-rods (T–2) and (T–4) are interrupted in the control arm 12 and in the receiving arm 15 and the ends thereof are each provided with a spur pinion: (5–4) (6–4) (7–4) (8–4) and (5–2) (6–2) (7–2) (8–2). The said pinions drive in pairs by means of an internal gear which is mounted to rotate freely in the assembly: (5–2) and (6–2) with (C1–2), (5–4) and (6–4) with (C1–4), (7–2) and (8–2) with (C2–2) and (7–4) and (8–4) with (C2–4), the function of which is to effect the transmission of the rotary motion of the link-rods (T–2) and (T–4) even if, as a result of the rotation of the control arm 12 and of the receiving arm 15, one of the components of each link-rod is displaced relatively to the other. This assembly constitutes a double transmission device of the "second kind" in accordance with the invention.

3.—*Displacement of the gripper about the axis $P_1-P_1'$*

The displacement of the handle 14 about the axis P–P' maintains the ring gear (CP.1) stationary against rotation together with the pinions (1–2) (1–4) and (2–2) (2–4) and drives in rotation in opposite directions the pinions (4–2) and (4–4) as well as the link-rods (T–2) and (T–4) which transmit this movement to the gripper 17 by means of a similar system which is located at the same end as the receiving component.

4.—*Rotary movement of the receiving arm*

The rotary movement of the control arm 12 which is integral with the ring gear (C1.1), as effected about the axis X–X' of said control arm, drives in rotation and in the same direction the pinions (1–1) (1–3), (2–1), (2–3), (3–1) (3–3) (4–1) (4–3) (5–1) (5–3) 6–1) (6–3). These latter, through the intermediary of the link-rods (T–3) and (T–1), transmit the movement at the gripper end through a chain of similar pinions (7–1) (7–3), (8–1) (8–3), (9–1) (9–3) (10–1) (10–3), thereby producing the rotation of the ring gear (C2.1) which is integral with the receiving arm 15. These two assemblies constitute two double transmission devices "of the first kind" in accordance with the invention.

5.——*Angular displacement of the receiving arm about the axis of 01–01'*

The angular displacement of the control arm 12 about the axis 0–0' maintains the pinions (1–1) (1–3), (2–1) (2–3) stationary against rotation and drives in rotation and in the same directions the pinions (3–1) (3–3), (4–1) (4–3), and drives (5–1) (5–3), (6–1) (6–3) as well as the link-rods (T–1) and (T–3) in opposite directions, which transmit this movement to the receiving arm by means of a series of similar pinions and thus effect the angular displacement of the receiving arm 15.

DOG-CLUTCH DISENGAGEMENT SYSTEM

The dog-clutch mechanism 24 (as shown in FIG. 3) which is actuated by means of the element 13 (shown in FIG. 2) is incorporated with the mechanism which effects the angular displacement of the receiving arm 15 for the purpose of disengaging the control arm 12 with respect to the receiving arm 15 so as to permit an angular difference between the two arms about axis X–X' or axis 0–0'.

The position of the pinion (6–1) makes it possible to ensure the normal rotation of the link-rod (T–1), the pinion of which (6–1a) is rigidly coupled to the coupling socket (6–1b), whereas the position of the pinion (6–3) disengages the link-rod (T–3) which carries the pinion (5–3) from the pinion (5–3) by withdrawing its pinion (6–3a) from the coupling socket (6–3b) while at the same time locking the link-rod (T–3), thereby freeing the control arm 12 from any repetition of this movement.

It is useful to note that the combined assembly of mechanisms which have been described in paragraphs 2, 3, 4, 5 and which produce action on the link-rods (T–1) (T–3) and (T–2) (T–4) represents a complex differential gearing system in accordance with the invention which permits the combination of the four movements: 2, 3, 4, 5.

6.—Telescopic movement of the receiving arm

Variation of the length of the receiving arm 15 is carried into effect by means of a double screw-and-nut system (VO.1) and (VO.2) which is actuated by the rotary motion of the link-rod (T–O), said link-rod being in turn driven by a reduction gear motor 25. The link-rod (TO) is fitted with a flexible shaft or double universal joint assembly 26a–26b at its point of passage across the axis $0_1$–$0_1'$ of the receiving arm 15.

The operation of the telescopic movement is carried out on the control arm by means of a series of rotary compensating contacts which enable the operator to exercise control over the withdrawal or extension of the arm.

7.–8.–9.—Rotation, translational movement and angular displacement of the bearing tube These movements are very simple and are carried out either on ball-bearings or roller-bearings. Said movements serve to displace the handling appliance and can be stopped during the operation of said appliance.

It is of interest to note that either all or a part of this assembly can be put to use. In fact, it is easy to give consideration only to the receiving portion of the handling appliance and to control in dependence on motors all the mechanisms which actuate said receiving arm, thereby permitting all other applications to handling operations conducted in the interior of a leak-tight vessel.

As will be readily understood, and as has in any case been brought out by the foregoing, the invention is not limited solely to the examples of embodiment or modes of application which have been described and illustrated but is intended, on the contrary, to comprise within its scope all alternative forms.

What we claim is:

1. In a motion transmitting device: first and second members; a pair of spaced parallel shafts journalled on each member; said members being rotatably connected together for rotary movement relative to each other about an axis to different positions in one of which a respective shaft of each pair is in alignment with a shaft of the other pair and in the others of which said shafts are out of alignment; transmission means drivingly connecting said shafts that are in alignment in said one position, each of said transmission means comprising a gear train and including a gear concentric to and journalled for free rotation about said axis; rotatable driving means drivingly connected to both shafts of one pair and rotatable driven means connected to both shafts of the other pair, whereby said members may be relatively rotated about said axis without rotating said driving or driven means and whereby said driving means may rotate said shafts and driven means in any relative position of said members about said axis.

2. A motion transmitting device as defined in claim 1 wherein said axis is substantially perpendicular to the axes of said pairs of shafts.

3. A motion transmitting device as defined in claim 1 wherein said axis is parallel to the axes of said shafts but laterally spaced therefrom.

4. In a motion transmitting device: driving means and remotely positioned driven means; said driving and driven means each comprising a first member, having a longitudinal axis, and pivoted to a second member about a transverse axis; at least a portion of each first member being rotatable thereon about said longitudinal axis; transmission means for transmitting movements of said portion of said first member of said driving means identically to said first member of said driven means, said transmission means comprising a pair of parallel drive trains each of which includes a first rotary shaft on each first member, and meshing gears; there being a gear of each train mounted for rotation about each of said transverse axes; said portion of each first member being gear-connected to said rotary shafts whereby rotation of one first member portion about its longitudinal axis causes at least those portions of both drive trains between said transverse axes to rotate in the same relative direction, and movement of one first member about its transverse axis causes those portions of said drive trains to rotate in opposite directions.

5. A motion transmitting device as defined in claim 4 including selectively operable clutch means in said drive trains whereby one drive train may be locked against rotation and the other drive train interrupted to thereby lock the first member of said driven means against certain movements while permitting said certain movements of the first member of said driving means.

6. In a motion transmitting device: driving means and remotely positioned driven means; said driving and driven means each comprising a first member, having a longitudinal axis, and pivoted to a second member about a transverse axis; at least a portion of each first member being rotatable thereon about said longitudinal axis; transmission means for transmitting movements of said portion of said first member of said driving means identically to said first member of said driven means, said transmission means comprising a pair of parallel drive trains each of which includes a first rotary shaft on said portion of said first member, spaced radially from said longitudinal axis and rotatable therearound with said portion; each train including a second rotary shaft on each first member; said first and second rotary shafts having adjacent ends provided with pinions thereon; a pair of gears freely rotatable about and concentric with said longitudinal axis; the said pinions of one train meshing with one of said gears and the said pinions of the other train meshing with the other gear.

References Cited by the Examiner
UNITED STATES PATENTS

| | | | |
|---|---|---|---|
| 1,143,537 | 6/1915 | Green | 74—665 X |
| 2,235,013 | 3/1941 | De Pew | 74—665 |
| 2,518,720 | 8/1950 | Richardson | 74—665 X |
| 3,033,059 | 5/1962 | Melton | 74—801 |
| 3,108,498 | 10/1963 | James et al. | 74—801 |

DAVID J. WILLIAMOWSKY, *Primary Examiner.*

DON A. WAITE, *Examiner.*